June 4, 1968  J. W. MICHENER ET AL  3,387,181
APPARATUS FOR DETERMINING THE DIFFERENTIAL ION COUNT
IN AN ATMOSPHERE AND FOR CONTROLLING SAME
Filed Nov. 5, 1963  2 Sheets-Sheet 1
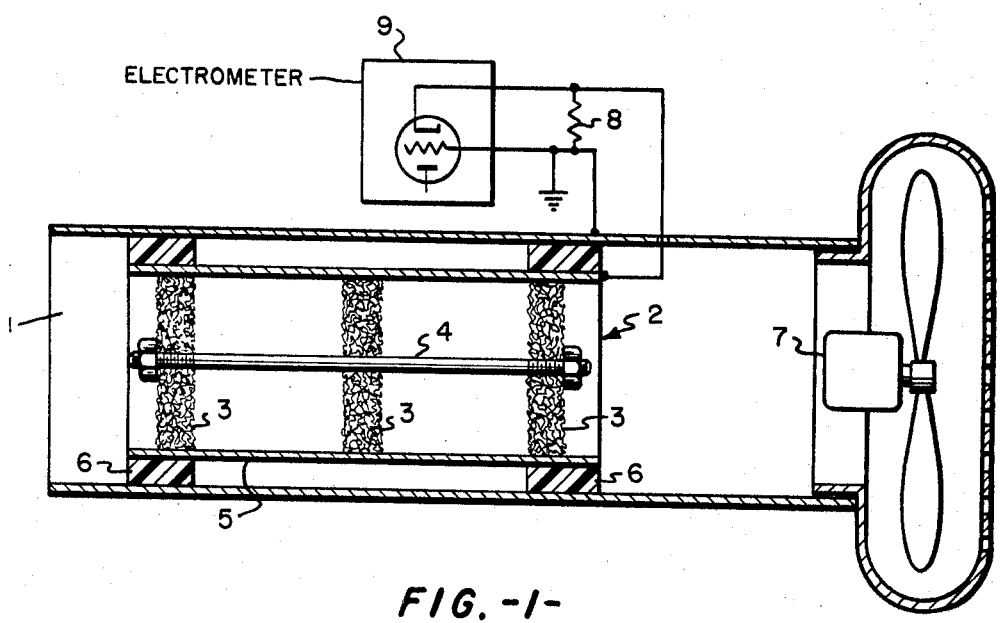
FIG.-1-
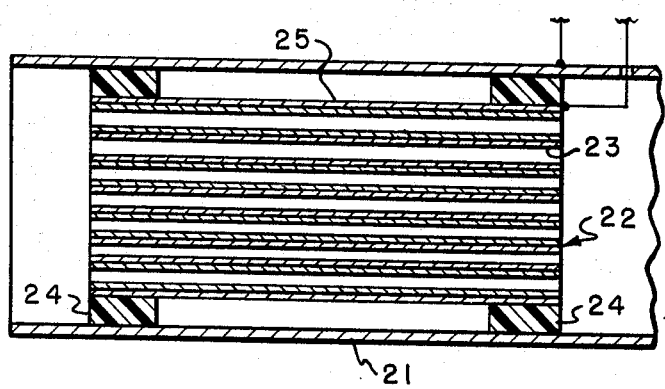
FIG.-2-
INVENTOR.
JOHN W. MICHENER
PHILIP N. SMITH
BY
ATTORNEY

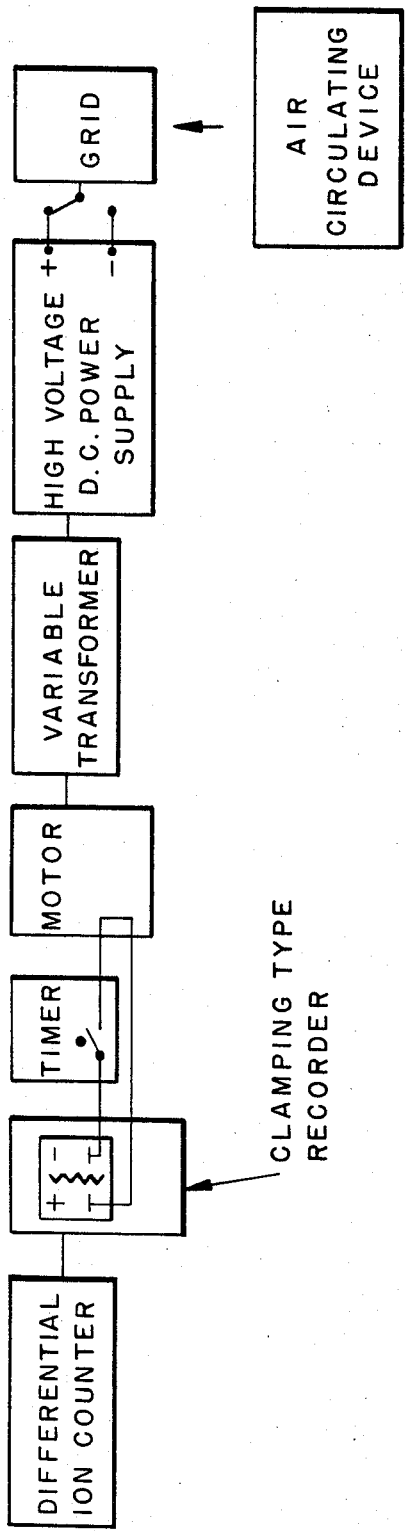
FIG. -3-

United States Patent Office 3,387,181
Patented June 4, 1968

3,387,181
APPARATUS FOR DETERMINING THE DIFFERENTIAL ION COUNT IN AN ATMOSPHERE AND FOR CONTROLLING SAME
John W. Michener and Philip N. Smith, Spartanburg, S.C., assignors to Deering Milliken Research Corporation, Spartanburg, S.C., a corporation of Delaware
Filed Nov. 5, 1963, Ser. No. 321,546
9 Claims. (Cl. 317—3)

This invention relates to an apparatus for determining atmospheric ion count.

Ion counting instruments are well-known devices, ion count being used in radiation detection systems as well as in atmospheric pressure and altitude measurements. All ion counting instruments currently available, however, are complex devices due to the fact that these devices are employed to independently measure both negative ions and positive ions. Independent measurements of negative ions and positive ions have been achieved by use of a deflecting electrode carrying a preselected charge which will deflect ions of like polarity toward a collecting electrode.

The recent development of automatic control apparatus for the regulation of atmospheric ion concentration has brought about a requirement for an instrument which will measure net space charge rather than positive ion concentration and negative ion concentration, that is to say, an instrument is desired which will determine the net excess of positive or negative ions. In order to continuously control the ionic content of the atmosphere it is also necessary to have a differential ion counter which wil give a continuous reading on net space charge. It can readily be seen that an ion measuring instrument which must be manually shifted from a positive ion content reading to a negative content reading and then by a subtraction process obtain the net space charge would be insufficient to produce the rapid readings necessary for a continuous atmospheric ion control operation.

It is therefore an object of this invention to provide an apparatus which will give a net space charge reading.

It is another object of this invention to provide an apparatus which will give a continuous net space charge reading.

It is still another object of this invention to provide a device for the continuous control of atmospheric ionic content which employs apparatus which will give a continuous net space charge reading.

In accordance with this invention it has now been discovered that the net space charge of the surrounding atmosphere may be determined by means of an ion counter comprising a chamber, ion collecting means disposed within said chamber, means for drawing atmosphere through said chamber and through said ion collecting means and means for determining the current resultant from the accumulation of ions on said ion collecting means.

A better understanding of the invention may be had from a description of the drawings which are as follows:

FIGURE 1 is an illustration partly in schematic form of the ion counter of this invention.

FIGURE 2 illustrates an alternate form of ion collecting means employed in the ion counter of this invention.

FIGURE 3 is a circuit diagram of a device for the continuous control of atmospheric ionic content which employs the ion counter of this invention.

With reference to FIGURE 1, it may be seen that a metallic cylindrical chamber 1 is employed to house ion collecting means 2, the ion collecting means 2 consisting of a series of metallic wire pads 3 joined by means of a metallic bar 4, the entire assembly being housed within and in electrical contact with metallic tube member 5.

The ion collector device 2 is maintained out of contact with cylindrical housing 1 by means of insulator rings 6. The cylindrical housing member 1 is joined to a fan 7 whereby atmosphere is drawn through cylindrical housing member 1 and through ion collecting means 2. The ion collecting device 2 is electrically connected to one termina of resistor 8 and the other terminal of resistor 8 is connected to cylindrical chamber 1. The resistor is preferably a resistor having a resistance in excess of $10^9$ ohms. The voltage appearing across resistor 8 is the result of the collection of ions on ion collecting means 2. This voltage is measured by means of electrometer circuit 9 the electrometer circuit 9 being independently zeroable and polarity reversible, the measurement being a proportional measurement of the current produced by the collection of ions. As the electrometer may be anyone of a number of well-known electrometer units, the electrometer circuit employed herein has not been shown in detail.

An alternate form of the ion collecting means is illustrated in FIGURE 2 of the drawings. In FIGURE 2, an ion collecting means 22 is composed of a plurality of longitudinally aligned metal tubes 23 contained within a large metallic tubular member 25. The ion collecting means 22 is maintained in an electrically insulated position within cylindrical housing member 21 by means of insulated spacer rings 24. An ion collecting device composed of a plurality of longitudinally aligned metal tubes is preferred where the atmosphere is heavily contaminated with particulate material and where the possibility of clogging of the ion collector device is very probable.

As previously mentioned, the ion counter of this invention determines the net excess of positive or negative ions, a feature which is accomplished by collection of substantially all the ionic material within a unit volume of atmosphere. The collection of the ionic material may therefore be accomplished by a simple mechanical collection and does not necessitate the complex high voltage circuitry necessary to selectively deflect negative or positive ionic material toward a collecting electrode. The mechanical ion collection means employed herein may be systems such as for instance metal wire pads and a plurality of longitudinally aligned metallic tube members. The ion collection means are calibrated for each ion counter device so as to produce maximum sensitivity, that is to say a balance is sought between maximum ion collection and minimum air flow obstruction.

While the apparatus of this invention is primarily designed to give a qualitative measure of the degree of inbalance existing between positive ions and negative ions, a quantitative measurement of net space charge per cubic centimeter of air may be had by calibrating the air pump employed.

The ion counter of this invention has particular utility in apparatus designed for producing a substantially neutral electric atmosphere or an amtosphere of reduced electric charge. In the handling of materials which are subject to influence by electrically charged bodies such as textile fibers, fine powders, thin films or, in general objects which have relatively small mass, various efforts have been made to overcome the effects of electrically charged bodies. Where atmospheric ionization in production areas is controlled by placing a direct current charged grid in the main air stream of an air circulating system, it is essential that the proper polarity and intensi'y of the grid current be determined and controlled. The differential ion counter of this invention may be employed to regulate the grid current. As illustrated in the circuit diagram of FIGURE 3 of the drawings, the differential ion counter is preferably employed in conjunction with a polarity and voltage regulator which employs as a principal constituent a recorder. When the recorder, which is periodically actuated by a timing mechanism, reaches a preselected ion count value, it places a motor in circuit which turns a variable transformer which is in circuit with the power supply thereby increasing or decreasing the voltage supplied to the grid. When the recorder reaches a preselected minimum ion value, it will also reverse the polarity of the high voltage power supply, thus permitting the annihilation of ions of another charge in the grid which is in the air flow of an air circulating device.

What is claimed is:

1. In combination with a grid carrying a direct current charge, an atmospheric differential ion counter device comprising a chamber, ion collecting means disposed within said chamber, means for drawing atmosphere through said chamber and through said ion collecting means and means for determining the current resultant from the accumulation of ions on said ion collecting means, said differential ion counter device determining the polarity and intensity of the charge on said grid.

2. The combination of claim 1 wherein said ion collecting means is at least one metal wire pad.

3. The combination of claim 1 wherein said ion collecting means is a plurality of longitudinally aligned metal tubes.

4. In combination with a grid carrying a direct current charge, an atmospheric differential ion counter device comprising a metallic chamber, ion collecting means disposed within and electrically insulated from said chamber, means for drawing atmosphere through said chamber and through said ion collecting means and an electrometer in circuit with said chamber and said ion collecting means whereby the current resulting from the accumulation of ions on said ion collecting means is determined, said differential ion counter device determining the polarity and intensity of the charge on said grid.

5. The combination of claim 4 wherein said ion collecting means is at least one metal wire pad.

6. The combination of claim 4 wherein said ion collecting means is a plurality of longitudinally aligned metal tubes.

7. An apparatus for the annihilation of atmospheric ions comprising a grid member, an air circulating system suitable for continuously passing air over said grid member, a high voltage source in circuit with said grid member, said high voltage source being controlled by a polarity and voltage regulator which functions in response to an atmospheric differential ion counter, said ion counter comprising a chamber, ion collecting means disposed within said chamber, means for drawing atmosphere through said chamber and through said ion collecting means and means for determining the current resultant from the accumulation of ions on said ion collecting means.

8. The device of claim 7 wherein said ion collecting means is at least one metal wire pad.

9. The device of claim 7 wherein said ion collecting means is a plurality of longitudinally aligned metal tubes.

References Cited

UNITED STATES PATENTS

| | | | |
|---|---|---|---|
| 2,491,445 | 12/1949 | Cunningham et al. | 324—32 X |
| 2,610,699 | 9/1952 | Penney et al. | 55—105 |
| 3,164,747 | 1/1952 | Yaknke | 317—2 |

MILTON O. HIRSHFIELD, *Primary Examiner.*

WALTER L. CARLSON, *Examiner.*

J. A. SILVERMAN, C. F. ROBERTS,
*Assistant Examiners.*